Figure 1:
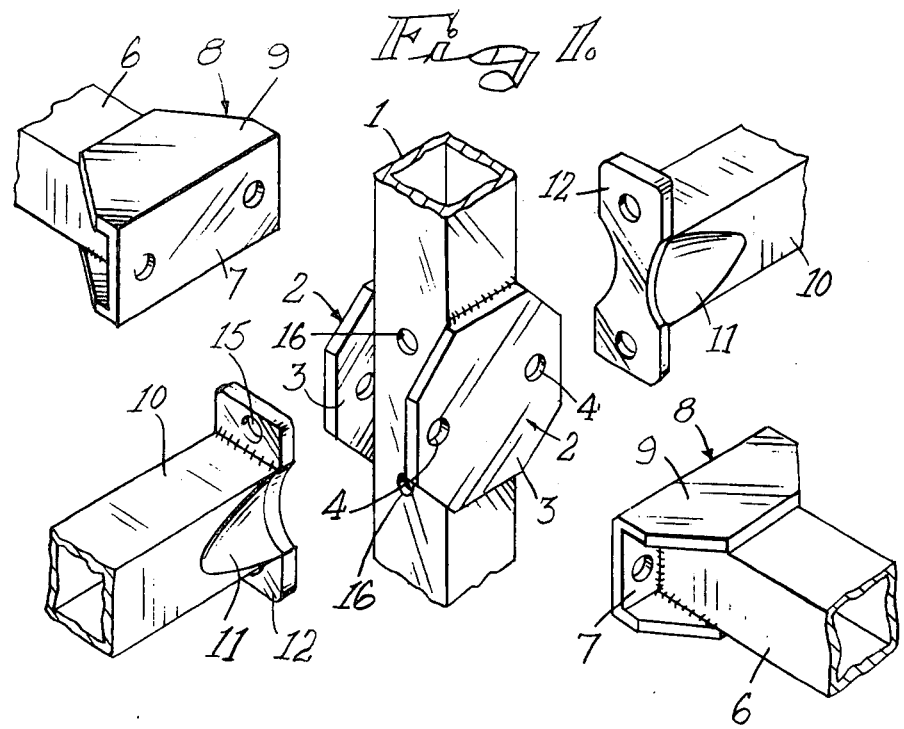

United States Patent [19]

Oppenheim

[11] 4,054,392
[45] Oct. 18, 1977

[54] RELEASABLE MECHANICAL JOINTS

[76] Inventor: Frank C. Oppenheim, P.O. Box 31806, Braamfontein, 2017, Transvaal, South Africa

[21] Appl. No.: 755,544

[22] Filed: Dec. 27, 1976

[51] Int. Cl.² .............................................. F16B 9/00
[52] U.S. Cl. .................................. 403/174; 403/189; 403/245; 403/262
[58] Field of Search ............. 403/174, 175, 178, 262, 403/245, 246, 199, 187, 171, 173, 177, 189; 52/283

[56] References Cited

U.S. PATENT DOCUMENTS

| | | | |
|---|---|---|---|
| 1,548,046 | 8/1925 | Lally | 52/283 |
| 2,374,550 | 4/1945 | McIntosh | 403/189 X |
| 3,593,477 | 7/1971 | Briggs | 52/283 X |
| 3,938,297 | 2/1976 | Sato et al. | 403/189 |
| 3,977,801 | 8/1976 | Murphy | 403/189 |

FOREIGN PATENT DOCUMENTS 1,409,718  10/1975  United Kingdom .................. 52/283

Primary Examiner—Andrew V. Kundrat
Attorney, Agent, or Firm—Cushman, Darby & Cushman

[57] ABSTRACT

A system of structural members comprising a basic structural member having secured to opposite sides thereof a pair of corresponding plates which extend outwardly from the sides of the basic structural member, and are adapted to enable two secondary structural members to be secured thereto by means of releasable fasteners, and at least one further structural member having an end provided with two opposite recesses shaped to allow said end to fit between the plates with heads of any fasteners abutting the plates on the insides thereof located in the recesses, this end further having a flange for securing it to the basic structural member.

5 Claims, 2 Drawing Figures

RELEASABLE MECHANICAL JOINTS

This invention relates to joints between structural members, and more particularly joints from which structural members may extend on three axes which are generally mutually at right angles to each other.

It is the object of this invention to provide a joint, and structural members therefore, which can be used to connect, in releasable manner, two, three or four generally co-planar structural members to a connection point on a basic structural member, wherein all the structural members may have substantially the same external dimensions.

In accordance with this invention there is provided a system of structural members comprising a basic structural member having secured to opposite sides thereof a pair of corresponding plates which extend outwardly from the sides of the basic structural member, and are adapted to enable two secondary structural members to be secured thereto by means of releasable fasteners, and at least one further structural member having an end provided with two opposite recesses shaped to allow said end to fit between the plates with heads of any fasteners abutting the plates on the insides thereof located in the recesses, this end further having a flange for securing it to the basic structural member.

Further features of the invention provide for the said two structural members to have transverse flanges adapted to be bolted to the outwardly extending portions of the plates, for the structural members to be of square cross-section and preferably tubular, and for the structural members to be adapted to be secured in a right angular relationship with respect to each other.

The invention also provides structural members adapted for use in the above defined system.

Figure 2:
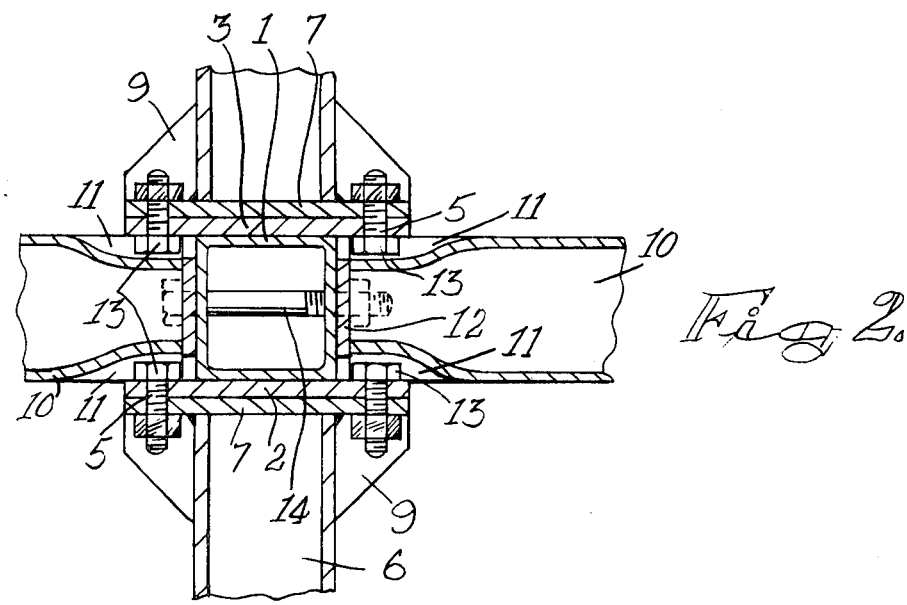

One embodiment of the invention will now be described by way of example, reference being made to the accompanying drawings in which:

FIG. 1 is an exploded isometric view of a joint between four structural members and a basic structural member, and FIG. 2 is a cross-section taken through the basic structural member and showing the assembled joint.

In this embodiment of the invention, a system of structural members is adapted to be connected into a rectangular multi-storey lattice defining a framework for a large building such as a warehouse for example. For this purpose up to four horizontal structural members are to be connected to vertical basic structural members. These connections in accordance with this invention are to be releasable so that the structure or parts thereof can be dismantled and re-used. In this example, all the structural members are made of square cross-sectioned metal tubing of the same cross-sectional dimensions.

In order to achieve this feature, each basic structural member 1 is provided at the required points along its length with pairs of flat plates 2 welded thereto. The members of each pair of plates are located on opposite faces of the tubular basic member, and extend outwardly from each side thereof with these outwardly extending portions 3 having perforations 4 therethrough for receiving bolts.

For connection to these plates, first structural members 6 are provided at their ends with flanges 7 defined by the web portion of a transverse channel member 8 welded to the structural member. The flanges 9 of these channel members are spaced to fit closely over the outer surfaces of the structural members and have their free edges welded thereto. The flanges 7 on these members are perforated so as to allow alignment thereof with the perforations 4 in the plates, so that the bolts 5 can be located correctly.

Second structural members 10 are provided for connection to the basic structural member, and at right angles to the said first structural members. The ends of the second structural members have two opposite walls thereof pressed inwardly to define recesses 11 therein, and a flange 12, having cut-outs corresponding to the recesses, is welded transversely onto the ends. These recesses are shaped to receive therein the heads 13 of the bolts 5 used for connecting the first structural members to the plates, and the flange fits neatly between these plates as shown clearly in FIG. 2.

It will be appreciated that two first and two second structural members as above described may easily be secured to the basic structural member in a co-planar relationship such that the three areas defined by the members are all mutually at right angles to each other.

Also, they may be secured to the basic structural member in any order provided that where the second structural members are secured in position first the bolt 5 are located in the holes prior to this connection. The second structural members are secured in position by bolts 14 passing through perforations 15 in the flanges 12 of the second structural members and through holes 16 in the basic structural member. The recesses are preferably shaped to prevent rotation of the bolt heads located therein after installation of the second structural members.

It will be appreciated that a joint as above described may easily be dismantled and the members re-used as required. Also, the joint may be made to a conveniently small size owing to the use of the recesses as above described. The plates may, of course, be provided with projecting studs welded thereto in order to obviate the necessity of providing recesses in the second structural members, but this variation is not preferred as studs are generally not as strong as bolts.

Further the right angular relationship of the structural members should not be seen as a restriction and a single structural member may include features of both a basic structural member and the second structural members.

What I claim is new and desire to secure by Letters Patent is:

1. A system of structural members comprising a basic structural member having secured to opposite sides thereof a pair of corresponding plates which extend outwardly from the sides of the basic structural member, and are adapted to enable two secondary structural members to be secured thereto by means of releasable fasteners, and at least one further structural member having an end provided with two opposite recesses shaped to allow said end to fit between the plates with heads of any fasteners abutting the plates on the insides thereof located in the recesses, this end further having a flange for securing it to the basic structural member.

2. A system as claimed in claim 1 in which the said two structural members have transverse flanges adapted to be bolted to the outwardly extending portions of the plates.

3. A system as claimed in claim 1 in which the structural members to be of square cross-section.

4. A system as claimed in claim 1 in which the structural members are tubular.

5. A system as claimed in claim 1 in which the structural members are adapted to be secured in a right angular relationship with respect to each other.

* * * * *